(12) United States Patent
Greene et al.

(10) Patent No.: US 8,192,839 B2
(45) Date of Patent: Jun. 5, 2012

(54) SILICONE FISHING LURE SKIRT WITH FOIL OR HOLOGRAPHIC FILM AND METHOD OF MAKING THE SAME

(76) Inventors: Daryl W. Greene, Pawleys Island, SC (US); Michael T. Shelton, North Charleston, SC (US); Van Truong, Saigon (VN)

( * ) Notice: Subject to any disclaimer, the term of this patent is extended or adjusted under 35 U.S.C. 154(b) by 0 days.

(21) Appl. No.: 12/800,052

(22) Filed: May 7, 2010

(65) Prior Publication Data

US 2010/0221527 A1    Sep. 2, 2010

Related U.S. Application Data

(63) Continuation of application No. 11/687,034, filed on Mar. 16, 2007, now Pat. No. 7,740,726.

(60) Provisional application No. 60/783,199, filed on Mar. 16, 2006.

(51) Int. Cl.
    B32B 7/04    (2006.01)
    B32B 7/12    (2006.01)
    B32B 27/08   (2006.01)
    B32B 27/28   (2006.01)
    B32B 27/36   (2006.01)

(52) U.S. Cl. ........ 428/335; 428/334; 428/339; 428/446; 428/447; 428/480; 428/458; 428/159.1; 156/153

(58) Field of Classification Search ............ None
    See application file for complete search history.

(56) References Cited

U.S. PATENT DOCUMENTS

| | | | | | |
|---|---|---|---|---|---|
| 3,656,253 | A | * | 4/1972 | Gaunt | 43/42.33 |
| 3,697,070 | A | * | 10/1972 | McAdow | 523/200 |
| 3,940,869 | A | * | 3/1976 | Roberts | 43/42.53 |
| 4,618,389 | A | * | 10/1986 | Agodoa | 156/307.5 |
| 4,728,567 | A | * | 3/1988 | Razzano et al. | 428/317.1 |
| 4,938,827 | A | * | 7/1990 | Leach et al. | 156/272.6 |
| 5,202,180 | A | * | 4/1993 | Watts | 428/324 |
| 5,251,395 | A | * | 10/1993 | Wicklund | 43/42.25 |
| 5,326,844 | A | * | 7/1994 | Fujiki et al. | 528/15 |
| 5,919,537 | A | * | 7/1999 | Niazy | 428/40.1 |
| 5,948,515 | A | * | 9/1999 | Tsunekawa | 428/215 |
| 5,960,580 | A | * | 10/1999 | Link | 43/42.53 |
| 6,036,997 | A | * | 3/2000 | Ragland et al. | 427/208.4 |
| 6,105,304 | A | * | 8/2000 | Wicklund | 43/42.25 |
| 6,272,787 | B1 | * | 8/2001 | Link | 43/42.53 |
| 6,544,372 | B2 | * | 4/2003 | Link | 156/250 |
| 6,800,372 | B2 | * | 10/2004 | Ikuta et al. | 428/447 |
| 7,323,251 | B2 | * | 1/2008 | Saitou | 428/480 |
| 7,647,722 | B2 | * | 1/2010 | Shelton et al. | 43/42.53 |
| 2001/0047609 | A1 | * | 12/2001 | Orgeron et al. | 43/42.31 |
| 2002/0098328 | A1 | * | 7/2002 | Boris et al. | 428/201 |
| 2005/0158472 | A1 | * | 7/2005 | Karthauser | 427/299 |

FOREIGN PATENT DOCUMENTS

| | | | |
|---|---|---|---|
| JP | 10-053659 | * | 2/1998 |
| JP | 10-058605 | * | 3/1998 |
| WO | WO 2005/051660 | * | 6/2005 |

* cited by examiner

*Primary Examiner* — Vivian Chen

(74) *Attorney, Agent, or Firm* — J. Bennett Mullinax, LLC

(57) ABSTRACT

An elastomer fishing lure skirt comprising a silicone based elastomer substrate having a rough side wherein the substrate is separated into a plurality of filaments. The lure skirt further comprises an adhesive such as CHEMLOK® 697 (an adhesive), RTV adhesive, LOCTITE® (an adhesive), or combinations thereof. The lure skirt further comprises a biaxially-oriented polyethylene terephthalate polyester film having a metalized foil, colored foil, holographic film, or combinations thereof bonded to its surface. Additionally, the lure skirt includes a means for semi-permanently binding the filaments together to form said lure skirt.

10 Claims, 2 Drawing Sheets ns, this skirt may present a poor profile since the Mylar backing is removed.

While each of the foregoing provides a type of lure skirt which functions as an attractant for fish, there is a need for improvement in both flash and maintaining an attractive profile for lure skirts under water.

SILICONE FISHING LURE SKIRT WITH FOIL OR HOLOGRAPHIC FILM AND METHOD OF MAKING THE SAME

RELATED CASES

This application claims the Priority of the Provisional Application Ser. No. 60/783,199 filed Mar. 16, 2006. This application is a continuation of application Ser. No. 11/687,034 filed Mar. 16, 2007 now U.S. Pat. No. 7,740,726.

FIELD OF THE INVENTION

Silicone based elastomer substrate laminated with biaxially-oriented polyethylene terephthalate polyester film, and articles made therefrom are discussed herein.

BACKGROUND OF THE INVENTION

Fishing lure skirts made from silicone are commercially available. Silicone fishing lure skirts with color and glitter additives have been widely accepted, as they appear colorful and work as a fish attractant. They can be molded or calendered into various shapes, normally sheets or tape and slit or dye cut into strands, then banded together to form a silicone fishing lure skirt. They can also be printed to add a fish scale like pattern to give a more life like appearance. Other products such as colored nylon, colored spandex, and coated polyester can be used as a skirt dressing for fishing lures.

The standard silicone fishing lure skirt with the introduction of colorant and glitter presents an acceptable profile as it is trolled or retrieved but the glitter shows minimal flash or reflection due to the fact that it is embodied within the silicone strands. The other products such as colored nylon, colored spandex, coated polyester present good flash and reflectivity, but due to their lack of elasticity and thickness, they collapse, tear apart, and present a poor profile when trolled, retrieved and fished.

Whether a lure is sinking or floating, its purpose is to attract the attention of the fish by simulating the look and movement of their natural prey. The idea is to have the fish react to the lure as if it is food or a threat within its territory. To this end the lure skirt has been developed over the years for a variety of fishing lures. In both fresh-water and salt water applications skirts are used to enhance and exaggerate lure movements. Skirts are also used to camouflage the hook in the lure. It is also believed that colored skirts attract attention or agitate the fish or exaggerate the movement of the lure.

U.S. Pat. No. 3,021,632 discloses the use of metalized plastic sheet film shredded into narrow ribbons having straight or serrated edges. The narrow ribbons are formed into a skirt and adhered to a fishing lure. However, the skirt lacks elasticity and may present a poor profile.

U.S. Pat. No. 5,251,395 discloses a metalized foil bonded to a silicone elastomer. The metalized foil is formed onto a Mylar carrier and the Mylar is removed when the foil is adhered to the silicone elastomer. However, this skirt may present a poor profile since the Mylar backing is removed.

U.S. Pat. No. 6,105,304 discloses a fishing lure skirt comprising a metalized foil bonded to a silicone elastomer. The cross-sectional thickness of the fishing lure skirt is smaller at its distal and steadily increases in size toward its proximal end. However, this skirt may present a poor profile due to the lack of a Mylar layer.

U.S. Pat. Nos. 6,272,787 and 6,544,372 each disclose a fishing lure skirt comprising a silicone rubber substrate and a room temperature vulcanizing (RTV) adhesive ink mixture. The RTV adhesive ink mixtures is used to illustrate fish scales or other patterns and as an adhesive to bond foils onto cured silicone rubber. The metalized foil utilized a Mylar backing that is removed once the foil has bonded to the silicone rubber. However, this skirt may present a poor profile since the Mylar backing is removed.

While each of the foregoing provides a type of lure skirt which functions as an attractant for fish, there is a need for improvement in both flash and maintaining an attractive profile for lure skirts under water.

SUMMARY OF THE INVENTION

An elastomer fishing lure skirt comprising a silicone based elastomer substrate having a rough side wherein the substrate is separated into a plurality of filaments. The lure skirt further comprises an adhesive such as CHEMLOK® 697 (an adhesive), RTV adhesive, LOCTITE® (an adhesive), or combinations thereof. The lure skirt further comprises a biaxially-oriented polyethylene terephthalate polyester film having a metalized foil, colored foil, holographic film, or combinations thereof bonded to its surface. Additionally, the lure skirt includes a means for semi-permanently binding the filaments together to form said lure skirt.

DETAILED DESCRIPTION

Figure 1:
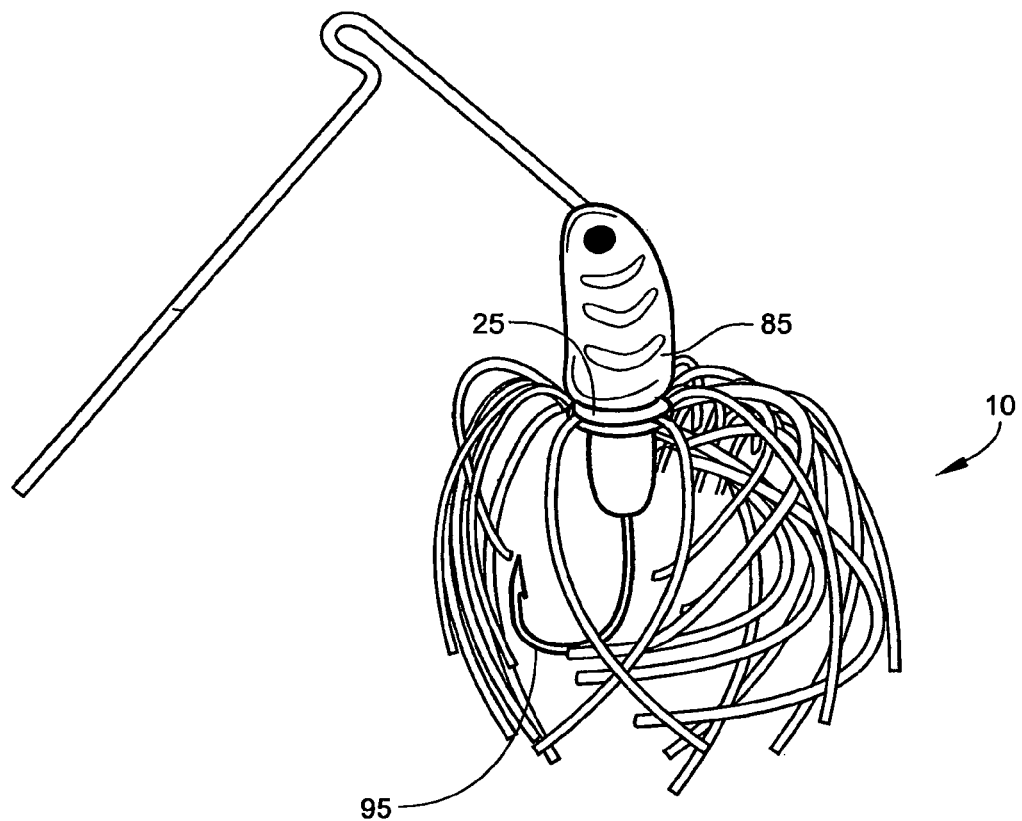
FIG. 1 illustrates an embodiment of a lure skirt on a lure.

Referring to the drawings, there is shown in FIG. 1 an embodiment of a lure skirt 10 used in conjunction with a lure 85. A lure skirt is generally made up of a plurality of strands. These strands may be of the same color or varied in color. The number of strands may vary from one embodiment of a lure skirt to another. A lure skirt 10 may be used in conjunction with a variety of lure types including, but not limited to, buzz baits, spinners, spinner baits, plugs, crankbaits, jigs, wobblers, surface lures, and spoons.

Figure 2:
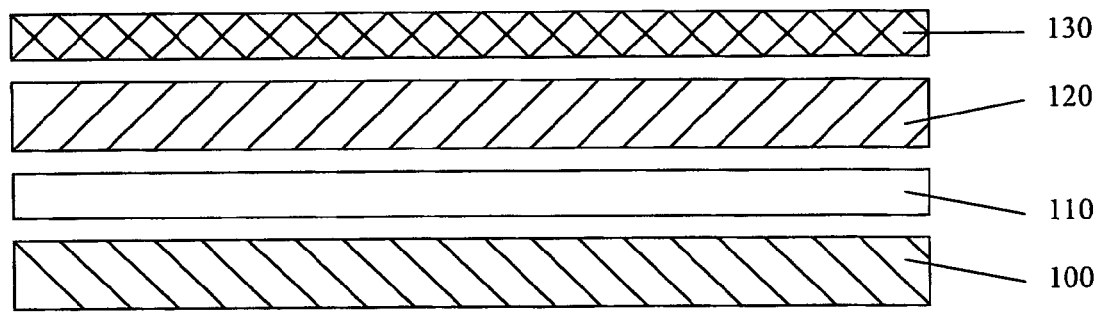
FIG. 2 is an exploded view of the components of a preferred form of the lure skirt.
Figure 3:
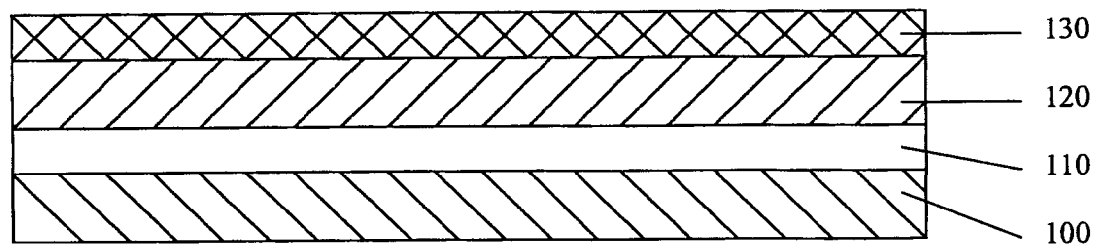
FIG. 3 is a cross-sectional view taken through a portion of a preferred form of the lure skirt.

A lure skirt 10 may be comprised of basic components such as a silicone based elastomer substrate 100, an adhesive 110, a biaxially-oriented polyethylene terephthalate polyester film (hereafter boPET film) 120, and a coated layer 130. With attention to FIGS. 2 and 3, the details of the construction of the presently improved lure skirt 10 are provided. A lure skirt 10 is generally fabricated by layering a plurality of materials on top of one another and adhering or bonding those materials together either permanently or semi-permanently. FIG. 3 depicts one embodiment of a cross-sectional view of the four layer construction of a lure skirt 10.

The base of the lure skirt 10 is comprised of a silicone based elastomer substrate 100. Silicone based elastomer substrate may be obtained from companies such as Dow Corning of Midland, Mich. In one embodiment, 5¾"×12" silicone sheets are compression molded, the sheets are then dye cut into strands. The strands can be either multiple individual strands or a block cut which has a first end having a unified section and a second end being comprised of a plurality of individual strands. This block cut reduces the total number of individual pieces that must be secured to create the lure skirt 10. In one embodiment of the present invention, the silicone based elastomer substrate 100 has a Shore A hardness of 20-80 durometer.

The Shore hardness is measured with an apparatus known as a Durometer and consequently is also known as 'Durometer hardness'. The hardness value is determined by the penetration of the Durometer indenter foot into the sample. Because of the resilience of rubbers and plastics, the indentation reading my change over time—so the indentation time is sometimes reported along with the hardness number. The ASTM test method designation is ASTM D2240 A and is generally used in North America. The Shore A is used to measure soft elastomeric compounds, harder compounds can be measured with a Shore D, Durometer. Related methods include ISO 7619 and ISO 868; DIN 53505; and JIS K 6301, which was discontinued and superseded by JIS K 6253. The results obtained from this test are a useful measure of relative resistance to indentation of various grades of polymers. As an example a rubber band would probably fall in the range of a shore A Durometer of 25-35.

The lure skirt 10 uses an adhesive 110 to bond the silicone based elastomer substrate 100 to the boPET film 120. While any type of adhesive may be used it has been found that a RTV (room temperature vulcanizing) adhesive, CHEMLOK® 697 (an adhesive), and LOCTITE® (an adhesive) work well in this application. RTV adhesives are available from G.E. and Dow-Corning of Midland, Mich. CHEMLOK® adhesives are available from the Lord Corporation of Cary, N.C. LOCTITE® adhesives are available from Henkel International of Irvine, Calif.

Biaxially oriented polyethylene terephthalate polyester film (hereafter boPET film) 120 is made from ethylene glycol and dimethyl terephthalate. BoPET film 120 is sold under the trademark Mylar and is available from DuPont Teijin Films of Wilmington, Del. In one embodiment of the present invention, the boPET film 120 has a thickness of between 0.25 mm and 0.46 mm. The boPET film 120 has a coating 130 on its surface. The boPET film 120 may be coated with a metalized foil, colored foil, holographic film, or combinations thereof. In yet another embodiment, a boPET film 120 may be coated with a material including, but not limited to, a chrome material, a gold material, a colored material, a holographic material, or combinations thereof. In yet another embodiment, the coating 130 is no more than 0.05 mm in thickness.

After the silicone based elastomer substrate 100, the adhesive 110, and the boPET film 120 having a coating 130 on its outer surface are laminated together creating a laminated elastomer substrate, a lure skirt may be assembled. In one embodiment of the present invention the lure skirt 10 may be assembled after cutting a sheet of laminated elastomer substrate. The sheets may be dye cut into strands. The strands can be either multiple individual strands or a block cut which has a first end having a unified section and a second end being comprised of a plurality of individual strands. In one embodiment of the present invention, the strands may be attached manually, mechanically or robotically to one another. In an alternative embodiment, a first band of adhesive 110 is applied either manually, mechanically or robotically to a plurality of strands which are subsequently attached to one another manually, mechanically or robotically.

A lure skirt described above may be attached or incorporated into a fishing lure through a variety of mechanisms including, but not limited to, rubber bands, wires, clasps, adhesives, fishing line, collars, or any combination thereof.

FIG. 1 illustrates one embodiment of the present invention wherein a lure skirt 10 is engagement with a lure 85. In one embodiment of the present invention the lure skirt 10 is positioned above the hook 95 of the lure 85. Positioning the lure skirt 10 in this manner may allow the lure skirt 10 to camouflage the hook 95 and to increase the profile of the lure 85 both in and out of the water.

The strands of the lure skirt 10 may have a color component which can be incorporated directly into the silicone based elastomer substrate 100. These strands may incorporate a color additive, or colorant, which is selected from the group consisting of: pigment, dye, color, glitter, mica, or combinations thereof. It is also possible for the colorant to be applied to the surface of the silicone based elastomer substrate 100 by a spray, printing or direct application method such as by brush or roller.

A process for laminating a sheet of boPET film 120 to a silicone based elastomer substrate 100 is also disclosed herein. The process may include providing a sheet of silicone based elastomer substrate 100 and providing an adhesive 110 such as CHEMLOK® 697 (an adhesive), RTV adhesive, LOCTITE® (an adhesive), or combinations thereof. The process may further include providing a sheet of boPET film 120. The boPET film 120 may be coated on one or more sides with a material such as chrome, gold, colored, holographic coating, or combinations thereof which are available from Crown Roll Leaf of Patterson, N.J. and Transfer Print Foils, Inc, of East Brunswick, N.J. The process may then involve roughing up the surface of the sheet of silicone elastomer 100, coating the roughed up sheet of silicone elastomer 100 with the adhesive 110, pressing the sheet of boPET film 120 onto the coated sheet of roughed up silicone elastomer 100, and heat curing the sheet of boPET film 120 to the coated sheet of roughed up silicone elastomer 100 while under pressure.

The outer surface of the silicone based elastomer substrate 100 may be roughed up on one or more sides prior coating the silicone based elastomer substrate 100 with adhesive 110. In one embodiment of the present invention, the roughing up of the surface of the silicone based elastomer substrate 100 may be accomplished with a material including, but not limited to, a metal brush, sandpaper, a blade, a nail, metal spikes, wooden spikes, a scouring pad, gravel, glass, plastic, or combinations thereof. Using a rough outer surface is in direct contradiction of prior art teachings such as U.S. Pat. No. 6,544,372 which utilizes RTV adhesive inks to bond foil to a silicone rubber substrate. '372 discloses at Column 5, Lines 15-19, "It has been determined that the foil does not bond well to rough rubber or granular, inked surfaces. Foil adhesion can therefore be prompted by conditioning the substrate during or after curing with a smooth mold cavity or smoothing template."

Adhesive 110 is applied either manually, mechanically or robotically, to the surface of the silicone based elastomer substrate 100. In one embodiment of the present invention, sufficient adhesive 110 may be applied to the roughed up surface of the silicone based elastomer substrate 100 either manually, mechanically or robotically. The adhesive 110 may be applied to the silicone based elastomer substrate 100 either before or after the sheet of silicone based elastomer substrate is dye cut into strands.

After an adhesive 110 is applied to the surface of the silicone based elastomer substrate 100, the boPET film 120 with a coating 130 on its outer surface is then pressed onto the adhesive 110. This serves to bond the boPET film 120 to the silicone based elastomer substrate 100. In one embodiment of the present invention, the boPET film 120 having a coating 130 may be bonded to the silicone based elastomer substrate 100 with an adhesive 110 followed by calendering to facilitate the bonding of all layers to one another.

A lure skirt 10 may then undergo heat curing while under pressure to promote adhesion between the various layers. There are several ways that cure can be accomplished. In one embodiment of the present invention, the assembled skirt may be calendered to facilitate the bonding of all layers to one another. In an alternative embodiment, the assembled skirt may be sent through a curing oven to cure the adhesive 110 and promote the adhesion between the silicone based elastomer 100, and the boPET film 130 with coating 140. In an alternative embodiment, the temperature may range between 20° C. and 100° C. In yet another alternative embodiment, the pressure may range between 68,900 Pa and 6,890,000 Pa (10 and 1000 psi). In still another alternative embodiment, the lure skirt 10 may be cured at a temperature in the range of 20° C. and 100° C. and at a pressure in the range of 68,900 Pa and 6,890,000 Pa (10 and 1000 psi). In still another alternative embodiment, the skirt might be set out at room temperature, defined to be between from 20 to 25° C. for a period of time long enough to effectuate cure. If the skirt is manufactured in a region where the ambient temperatures regularly exceed the definition of room temperature, in excess of 25° C., then leaving the skirts out in this environment will also effectuate cure.

The present invention may be embodied in other forms without departing from the spirit and the essential attributes thereof, and, accordingly, reference should be made to the appended claims, rather than to the foregoing specification, as indicated the scope of the invention.

The invention claimed is:

1. A laminated silicone based elastomer comprising: a silicone based elastomer substrate having a mechanically roughened side that is a portion of said silicone based elastomer substrate; an adhesive applied to said roughened side; a biaxially-oriented polyethylene terephthalate polyester film (hereafter boPET film), wherein said adhesive is arranged as a single layer located between and contacting both the roughened side of the silicone based elastomer substrate and the boPET film, wherein the mechanically roughened side of the silicone based elastomer substrate is rougher than the surface on the opposite side of said silicone based elastomer substrate.

2. The laminated silicone based elastomer of claim 1 wherein said adhesive is RTV adhesive.

3. The laminated silicone based elastomer of claim 2 wherein said sheet of boPET film being coated with a material selected from the group consisting of: metalized foil, colored foil, holographic film, or combinations thereof, wherein said coating is a layer that forms an exterior surface of said laminated silicone based elastomer and wherein said bePET film is a layer that is an interior layer of said laminated silicone based elastomer.

4. The laminated silicone based elastomer of claim 3 wherein said boPET film being between 0.25 to 0.46 mm in thickness.

5. The laminated silicone based elastomer of claim 3 wherein said coatings being no more than 0.05 mm in thickness.

6. The laminated silicone based elastomer of claim 3 wherein said substrate being of a Shore A hardness of 20-80 durometer.

7. The laminated silicone based elastomer of claim 1 wherein said boPET film being between 0.25 to 0.46 mm in thickness.

8. The laminated silicone based elastomer of claim 7 wherein said adhesive is RTV adhesive.

9. The laminated silicone based elastomer of claim 1 wherein said substrate being of a Shore A hardness of 20-80 durometer.

10. The laminated silicone based elastomer of claim 1 wherein said sheet of boPET film being coated with a material selected from the group consisting of: metalized foil, colored foil, holographic film, or combinations thereof, wherein said coating is a layer that forms an exterior surface of said laminated silicone based elastomer and wherein said bePET film is a layer that is an interior layer of said laminated silicone based elastomer.

* * * * *